US012685406B2

(12) United States Patent
Wild et al.

(10) Patent No.: US 12,685,406 B2
(45) Date of Patent: Jul. 21, 2026

(54) METHOD FOR OPERATING A FOOD PROCESSING APPARATUS

(71) Applicant: Welbilt Deutschland GmbH, Eglfing (DE)

(72) Inventors: Hannes Wild, Riegsee (DE); Arndt Manter, Horgenzell (DE)

(73) Assignee: Welbilt Deutschland GmbH, Eglfing (DE)

( * ) Notice: Subject to any disclaimer, the term of this patent is extended or adjusted under 35 U.S.C. 154(b) by 749 days.

(21) Appl. No.: 18/084,898

(22) Filed: Dec. 20, 2022

(65) Prior Publication Data

US 2023/0190035 A1      Jun. 22, 2023

(30) Foreign Application Priority Data

Dec. 22, 2021    (EP) ..................................... 21216750

(51) Int. Cl.
*A47J 36/32*        (2006.01)
*A47J 44/00*        (2006.01)

(52) U.S. Cl.
CPC ............. *A47J 36/321* (2018.08); *A47J 44/00* (2013.01)

(58) Field of Classification Search
CPC ...... A47J 36/321; A47J 44/00; G05B 19/0423
See application file for complete search history.

(56) References Cited

U.S. PATENT DOCUMENTS

2016/0277435 A1*   9/2016   Salajegheh ........... H04W 12/12
2018/0292092 A1*  10/2018   Bhogal ................... F24C 7/085

FOREIGN PATENT DOCUMENTS

DE      102016219972 A1     4/2018
EP          3839845 A1     6/2021

OTHER PUBLICATIONS

EP21216750.6. European Search Report (Jul. 1, 2022).

* cited by examiner

*Primary Examiner* — Thien S Tran
(74) *Attorney, Agent, or Firm* — LOZA & LOZA, LLP; David S. Sarisky

(57)        ABSTRACT

A method for operating a food processing apparatus comprises: collecting feedback information by means of a human-machine interface (MMI), and/or by means of at least one sensor; creating, by means of a local control unit, feedback data sets representing one or more of the feedback information items; sending the feedback data sets from the apparatus to a central computing unit; classifying, by means of the central computing unit, the feedback data sets on the basis of at least one stored feedback comparison data set; generating, by means of the central computing unit, a change signal depending on the classification of at least one feedback data set; sending the change signal to the apparatus; changing a user input request directed to the user by the MMI in the apparatus based on the change signal and/or changing a function program of the apparatus based on the change signal.

14 Claims, 4 Drawing Sheets

Fig. 3

METHOD FOR OPERATING A FOOD PROCESSING APPARATUS

CROSS-REFERENCE TO RELATED APPLICATION

This application claims priority to European Patent Application No. EP21216750.6, entitled "Method for Operating a Food Processing Apparatus" and filed on Dec. 22, 2021, which is expressly incorporated by reference herein in its entirety.

TECHNICAL FIELD

The invention relates to a method for operating a food processing apparatus. Furthermore, a food processing apparatus is described that is used for carrying out the method.

BACKGROUND

Food processing apparatuses, for example cooking apparatuses, can be connected to a central computing unit (server) for data transmission. The data is usually transmitted via the internet. This makes it possible to supply the food processing apparatus with software updates in order to optimize the food processing result, for example.

SUMMARY

The present invention is based on the data connection between the food processing apparatuses and higher-level computing units known from the prior art and is intended to be able to perform the operation of the processing apparatuses as efficiently as possible.

The object is solved by the features of the independent claim. The dependent claims are subject to preferred embodiments of the invention.

Within the scope of the method according to the invention, at least one food processing apparatus is used, which is hereinafter referred to as "apparatus." In particular, the method considers the information exchange with a plurality of these apparatuses, wherein they may be the same or different. A plurality of the apparatuses having the same or similar properties can be combined to form apparatus groups.

In particular, the apparatuses are food warming apparatuses, in particular cooking apparatuses, deep fryers, continuous furnaces, combi-steamers, grills, cookers, microwave ovens and/or holding ovens. Furthermore, the apparatus considered here comprises, for example, ice cream machines for producing and/or mixing ice cream, and also, for example, beverage systems, in particular dispensing systems or coffee machines.

Preferably, the apparatuses considered here are commercial apparatuses, which are not used in private households, but in commercial enterprises, in particular kitchen and food dispensing stations.

The present invention is basically based on the idea of collecting feedback from the user of the apparatus and/or from the apparatus itself, which in turn can be used to improve the apparatus, in particular the software of the apparatus. This feedback is referred to as "feedback information" within the scope of the invention. The user of the apparatus is in particular the person who operates the apparatus. The present invention considers that such feedback information can be of different quality. Feedback information is therefore classified, whereby only appropriately classified and thus high-quality feedback information is ultimately used for the improvement process.

In detail, the method according to the invention comprises the following steps, preferably in a given order:

According to Step A, feedback information is collected. In particular, feedback information can be collected several times on the same apparatus. Feedback Information can be collected regularly or irregularly. In particular, the collection of the feedback information or the time of collection may depend on operating states of the corresponding apparatus. Particularly preferably, the method involves collecting feedback information from a plurality of apparatuses.

Feedback information can be provided by means of a human-machine interface, which is hereinafter referred to as "MMI". The MMI is located on the apparatus or is connected to the apparatus at least in terms of information technology. The apparatus can output information to the user by means of the MMI and can collect inputs from the user. The detailed embodiment is explained in detail within the scope of steps A1 and A2. With respect to the hardware, the MMI can be designed, for example, as a touch-sensitive display and/or as a voice control unit on the apparatus. Additionally. or alternatively, the MMI may be a terminal device, in particular a portable terminal device (e.g., smartphone, smartwatch or tablet), that is connected to the apparatus in terms of information technology.

As an addition or alternative to the MMI, feedback information is collected via at least one sensor on the apparatus. In detail, the feedback collection via the sensor is explained on the basis of A3, A4 and A5.

According to Step B a feedback data set is created. This is preferably performed or carried out by a local control unit that is to be assigned to the apparatus. The control unit can be integrated in the apparatus or located at the installation site of the apparatus, for example as a local computer. The feedback record represents one or more of the feedback information collected. In the simplest case, such feedback information may contain the information content of, for example, "YES/NO" or "GOOD/BAD", etc. In the practical embodiment, however, the feedback information is preferably more complex and in particular comprises a plurality of steps. In addition to the pure feedback information, the apparatus can collect associated circumstances and/or operating states of the apparatus and store them in the associated feedback data set. Accompanying circumstances may include, for example, the time of day, the food being processed, climatic conditions in the room, etc. The operating status describes, for example, the executed function program of the apparatus, filling levels on the apparatus, etc.

In Step C, the Feedback data sets are transmitted from the apparatus to a central computing unit. For this purpose, the apparatus comprises in particular a data interface. The information exchange between the central computing unit and the apparatus can be wireless and/or wired. In particular, the data is exchanged via the Internet. The central computing unit can be a single computer (also: server). Alternatively, the central computing unit can also be distributed over a plurality of locations or completely or partially implemented in a cloud. In particular, it is envisaged that the central computing unit is operated by the manufacturer of the apparatus or by a sales organization of the apparatus.

In Step D, the feedback data sets are classified. This classification takes place in the central computing unit. In this case, the individual feedback data set is classified on the basis of at least one stored feedback comparison data set. A plurality of the feedback data sets can also be combined and classified together. Furthermore, it is possible to classify one or more feedback data sets using a plurality of feedback comparison data sets.

In particular, the classification process includes checking the extent to which the feedback data set matches or deviates from at least one feedback comparison data set. Thus, in the context of this classification, the feedback data set can also be referred to as the "actual value" and the feedback comparison data set as the "target value".

In particular, the classification of feedback records is used to distinguish between credible and untrustworthy feedback information, wherein there are any number of steps between credible and untrustworthy. In this case, it can be considered that untrustworthy feedback information occurs for a wide variety of reasons. For example, feedback information collected by a sensor may provide incorrect and thus "untrustworthy" feedback information due to hardware or software errors. Furthermore, feedback information can be queried by the user, and users may provide feedback for a wide variety of reasons, ultimately classifying it as "untrustworthy." For example, the question posed to the user via the MMI may be in the wrong language, or the user may simply be under an excessively high workload, in such a manner that he or she makes some input at the MMI in order to finish querying the feedback information at the MMI as quickly as possible.

In Step E, a change signal is generated by means of the central computing unit. A plurality of different change signals can also be generated for a plurality of different apparatuses. The change signal is dependent on the previously performed classification of the feedback data sets. A plurality of classified feedback data sets can also be combined in order to ultimately influence the configuration of a change signal for a specific apparatus or a specific apparatus group.

In Step F, the change signal is sent to the apparatus. In this case, the same or different change signals can also be transmitted to a plurality of apparatuses. As described above, the data is exchanged, including the transmission of the change signal, preferably via the Internet and the data interface of the apparatus.

In Step G, the MMI in the apparatus is changed based on the change signal and/or a function program of the apparatus is changed based on the change signal. Correspondingly, the change signal is designed for this purpose and contains the necessary information for the apparatus to change the MMI and/or a function program accordingly.

When the MMI is changed, a "user input request" directed to the user is changed according to the change signal. This "change of the user input request addressed to the user" includes in particular the activation and deactivation of such user input request as well as the change of the content of such user input request. In response to the user input request, the user can provide a user feedback via the MMI, which in turn represents a feedback information according to step A.

However, the collected feedback information, in particular of a plurality of apparatuses, can also be used to change not only the MMI, but also, for example, a functional program of the apparatus.

As mentioned earlier, feedback information can be collected in different ways. According to Step A1, it is preferably provided that the feedback information comprises user feedback requested by the user via the MMI, in particular in the form of a question to the user. In particular, this can be a "user input request" that has already been changed as part of step G or that is already activated in the delivery state of the apparatus.

For example, the MMI, via the touch-sensitive display or the voice control unit, can request the user to provide user feedback. This user feedback can be given by the user to the MMI, for example by pressing on the display or by a voice input—whereby the feedback information is transferred to the apparatus. In addition to the feedback information. e.g., the answer to the question, the feedback data set generated can also contain information about the question asked by the user and, for example, the circumstances under which this took place.

Furthermore, it is provided that Step A2 the collected feedback information comprises an operating input. This operating input is made by the user at the MMI and is used to operate the apparatus, for example to select, start or terminate a function program. The MMI does not issue any question to the user for this type of feedback information, but an operating input for operating the apparatus, which is already undertaken by the user, is used to obtain feedback information. If, for example, the apparatus detects that the user inserts a particular food product into the apparatus and, in response, the apparatus proposes a function program A. and the user then selects a different function program by means of an operating input, these circumstances may be summarized as feedback information in the feedback record. It can be derived from this, for example, that the proposal provided by the apparatus for function program A may be incorrect, considering the given circumstances.

In particular, it is provided, associated with step A2, that for step D, a specified feedback is used that is determined in the apparatus or in the central computing unit based on a degree of correspondence of the operating input with a stored operating input expectation value. In the above example, this operating input expectation value would be the acceptance of function program A by the user. The fact that the user deviates from this proposal and selects a slightly changed function program or a completely different function program can be used to determine the degree of correspondence between operating input and the operating input expected value and thus further specify the feedback information.

According to Step A3, the collected feedback information comprises a user action performed on the apparatus by the user, wherein said user action is detected via at least one sensor. Within the scope of the description of the invention, reference is usually made to a sensor on the apparatus In fact, however, a plurality of identical or different sensors can also be used. In order to collect the user action, the sensor is preferably designed as a camera. This camera and a corresponding evaluation can be used, for example, to record whether the user follows a proposal made by the apparatus, for example, carries out an optical inspection of the food or cleans the apparatus.

In particular, it is provided, associated with step A3, that for step D, a specified feedback is used that is determined in the apparatus or in the central computing unit based on a degree of correspondence of the user action with a stored user action expectation value. In particular, if a user action is recorded via the camera, its precise evaluation in the central computing unit is a good idea, since images and videos can be analyzed here with relatively large computing effort.

Within the scope of steps A1 to A3, a direct collection of feedback information about the user was described. However, it is also possible to collect the feedback information directly on the apparatus via the sensor(s) described. In this case, the feedback information is preferably influenced by the user directly or indirectly.

According to Step A4, the food processed with the apparatus and/or at least a part of the apparatus and/or a state of the apparatus is recorded via the sensor, in particular designed as a camera, from which corresponding sensor data is generated. The feedback information then in turn includes this sensor data.

For example, the sensor can record which food is inserted into the apparatus. If the user selects a function program that is actually not suitable for the inserted food, this can result in corresponding feedback information indicating that the function program actually intended for this food is unsuitable.

By recording at least a part of the apparatus with the sensor (in particular camera), the cleaning condition of the apparatus can be detected, for example. This can be used, for example, to derive the feedback information that suggested cleaning cycles are inappropriate for this apparatus.

Furthermore, a state of the apparatus can be detected by means of the sensor, wherein this state of the apparatus depends in particular on a user action or a user non-action. A mere example is the filling level of an auxiliary means of the apparatus (e.g., cleaning liquid), which can be detected via a sensor on the apparatus. In the context of the feedback information, the fill level detected via the sensor indicates whether the user has replenished or not the auxiliary means, in particular after a corresponding request by the apparatus. In this respect, the sensor can provide feedback information about an action or non-action of a user.

In particular, it is provided, associated with step A4, that for step D a specified feedback is used that is determined in the apparatus or in the central computing unit based on a degree of correspondence of the sensor data with stored target sensor data.

According to Step A5 an auxiliary means value of the apparatus, in particular a quantity value and/or quality value of an auxiliary means, can be detected via the sensor. The feedback information in turn comprises the auxiliary means value. The auxiliary means may be, for example, the filling level of a cleaning means of the apparatus or, for example, the quality value of the frying oil, if the apparatus is a deep fryer. If, for example, the level of the cleaning means does not match an assumed level resulting from the number of cleaning programs carried out, the deviation in this respect can be part of the feedback information and used for improvement.

As mentioned at the outset, it is preferred that a plurality of groups of apparatuses, each with a plurality of apparatuses, are used within the scope of the method. In particular, feedback information is acquired for a plurality of apparatuses of each apparatus group in step A and/or a change signal is transmitted to a plurality of apparatuses of each apparatus group in step F.

Of course, it is also possible that the feedback information is recorded in each apparatus of a respective group. However, it may also be sufficient to collect feedback information in only some of the apparatuses and use this collected feedback information to generate inferences to generate the change signal for multiple or all apparatuses in the same group of apparatuses. In the same manner, it is possible to send the change signal to all apparatuses of the respective apparatus group in step F. However, individual apparatuses of the apparatus group can also be excluded or receive a different change signal in terms of content.

An advantage of grouping a plurality of apparatuses is that a great deal of feedback information can be collected, which in turn can be evaluated to create feedback comparison data sets. In addition, grouping makes it possible to "exclude" individual apparatuses, at least temporarily, if feedback information or the associated feedback data sets are appropriately classified as "untrustworthy" by these apparatuses. Nevertheless, the change signal can be used to improve the functional programs of all apparatuses in the apparatus group, regardless of whether the individual apparatus provides credible or implausible feedback information. In addition, it is particularly expedient in the apparatus group to identify the apparatuses with credible feedback data sets and, in particular, to request the users via user input requests issued by the MMI to provide further feedback information on these apparatuses via the change signal.

To this end, it is provided in particular that the apparatuses of the different apparatus groups differ at least with respect to the following properties: Apparatus type of the apparatus and/or intended use of the apparatus and/or regional installation site of the apparatus and/or apparatus equipment of the apparatus.

Apparatus type is understood to mean, in particular, as the type of food processing apparatus. For example, combi-steamers can be grouped together, and deep fryers can be grouped together. The intended use is in particular the use of the apparatus with the respective user, in such a manner that, for example, combi-steamers in bakeries are grouped together in one group and combi-steamers in canteens are grouped together in another group. The regional installation location can consider corresponding regional differences, for example, individual continents, countries or regions (for example, Alpine region). The apparatus equipment considers the fact that relatively similar apparatuses, for example two combi-steamers of the same series, can have different equipment. For example, one apparatus may be "equipped with automatic cleaning program" and other apparatuses may be "without automatic cleaning program".

Within the scope of the method according to the invention, it is also provided that one and the same apparatus can be assigned to a plurality of groups. For example, it is irrelevant for the evaluation of feedback information regarding a specific cooking program whether this apparatus is equipped with automatic cleaning function or not. Thus, with regard to the evaluation of such feedback information, the group can be formed, for example, only depending on the apparatus type or regional installation location or intended use, whereas in the case of an evaluation of feedback information relating to the automatic cleaning program, a group is formed considering the apparatus equipment.

The respective feedback data set is classified preferably depending on its, in particular gradual, correspondence with at least one feedback comparison data set. In this case, as mentioned at the outset, a simple classification can be made into credible and untrustworthy feedback. However, it is particularly preferred to compare the feedback data set with one or a plurality of feedback comparison data sets in such a manner that it results in a gradual classification. Gradual classification means that the feedback data set and the associated feedback information can be classified into more than two different classes.

This checking of the feedback data set or the comparison of the feedback data set with at least one feedback comparison data set is preferably carried out in the central computing unit with the aid of artificial intelligence. As mentioned above, such a feedback record may contain, for example, images or videos that can be evaluated via appropriate algorithms based on artificial intelligence.

The feedback comparison data sets are preferably based on multiple feedback data sets of the same apparatus and/or multiple feedback data sets of multiple apparatuses, in particular the same apparatus group, and/or empirical data.

A plurality of feedback data sets are collected from one apparatus or from the multiple apparatuses, which are analyzed in the central computing unit. Thus, feedback comparison records can be generated from the multiple feedback records via statistical analysis. In the context of the statistical evaluation, the feedback data sets are identified, preferably by means of artificial intelligence, in particular with respect to patterns and/or regularities and/or irregularities and/or clusters and stored accordingly in the feedback comparison data sets. As a result, it is possible to detect whether the underlying feedback information fits a known pattern or not, for example, when a new feedback data set is created. For example, if the feedback information does not fit a known pattern, the corresponding feedback record may be classified as untrustworthy.

The statistically generated feedback comparison data sets can be manually revised based on empirical data. Furthermore, it is possible to write feedback comparison data sets based on empirical data and store them in the central computing unit.

A so-called change data set can be generated and/or changed in the central computing unit depending on the classification of the feedback data set. This change data set can be used to store the manner in which and/or the time when the user input request of the MMI is to be changed on the apparatus by means of the change signal. Additionally, or alternatively, the change data set stores in which manner and/or at which time the functional program of the apparatus is changed by means of the change signal.

By applying and adapting such a change data set in the central computing unit, it can be taken into account that certain apparatuses or apparatus groups are to be controlled at certain times, for example times of day or seasons, via a corresponding change signal. As a result, it is possible to influence the apparatus with respect to the user input request and/or with respect to the function program under certain conditions, for example, the time. For example, it can be recognized that at certain times of the day, such as in the morning hours at a bakery, credible feedback information cannot be expected because the stress level is too high. This information can be used to disable the user request function of the MMI for the corresponding time of the day, so as not to annoy the user. In some circumstances, it may also be possible to recognize that function programs, for example the value of the air humidity in a cooking program, must be adjusted depending on the time of year and/or depending on other boundary conditions, such as the weather. Such information can also be stored in the change record to generate and send change signals to the apparatuses as needed.

As already explained, step G can be used to change a function program completely or partially in the apparatus. Complete change means in particular that function programs are deleted or added. Partial change of function programs can be, for example, adjustment of individual parameters in the function program.

Functional programs are understood to mean in particular, but not exclusively, the following programs. A food processing program, for example a cooking program with parameters for time, temperature, humidity, etc., for processing food in the apparatus; and/or a cleaning program for cleaning the apparatus; and/or an assistance program (also assistance system) that assists the user in operating and/or maintaining the apparatus, in particular by providing instructions via the MMI. Assistance programs contemplated herein include, for example, a selection program that can in turn be used to select other programs, including other function programs of the apparatus; and/or an assistance program for displaying change times and/or quantities and/or or qualities of an auxiliary means of the apparatus, for example, cleaning means or frying oil.

The invention further comprises the described food processing apparatus, which is for use in carrying out the described method. To this end, the apparatus comprises the described human-machine interface (MMI) and/or the at least one described sensor, each designed to carry out step A; the described control unit, designed to carry out step B; the described data interface, designed to send the feedback data set according to step C and to receive the change signal sent according to step F; wherein the apparatus, in particular the control unit, is designed to change the user input request of the MMI directed to the user and/or to change the function program of the apparatus according to step G.

The advantageous embodiments and associated dependent described in the context of the method have corresponding advantageous application to the food processing apparatus according to the invention.

BRIEF DESCRIPTION OF THE DRAWINGS

Further details, advantages and features of the present invention will be apparent from the following description of an example embodiment with reference to the drawings. The drawings show:

FIG. 3 an apparatus according to the invention for use in carrying out the method according to the invention, designed as a combi-steamer.

DETAILED DESCRIPTION

Figure 1:
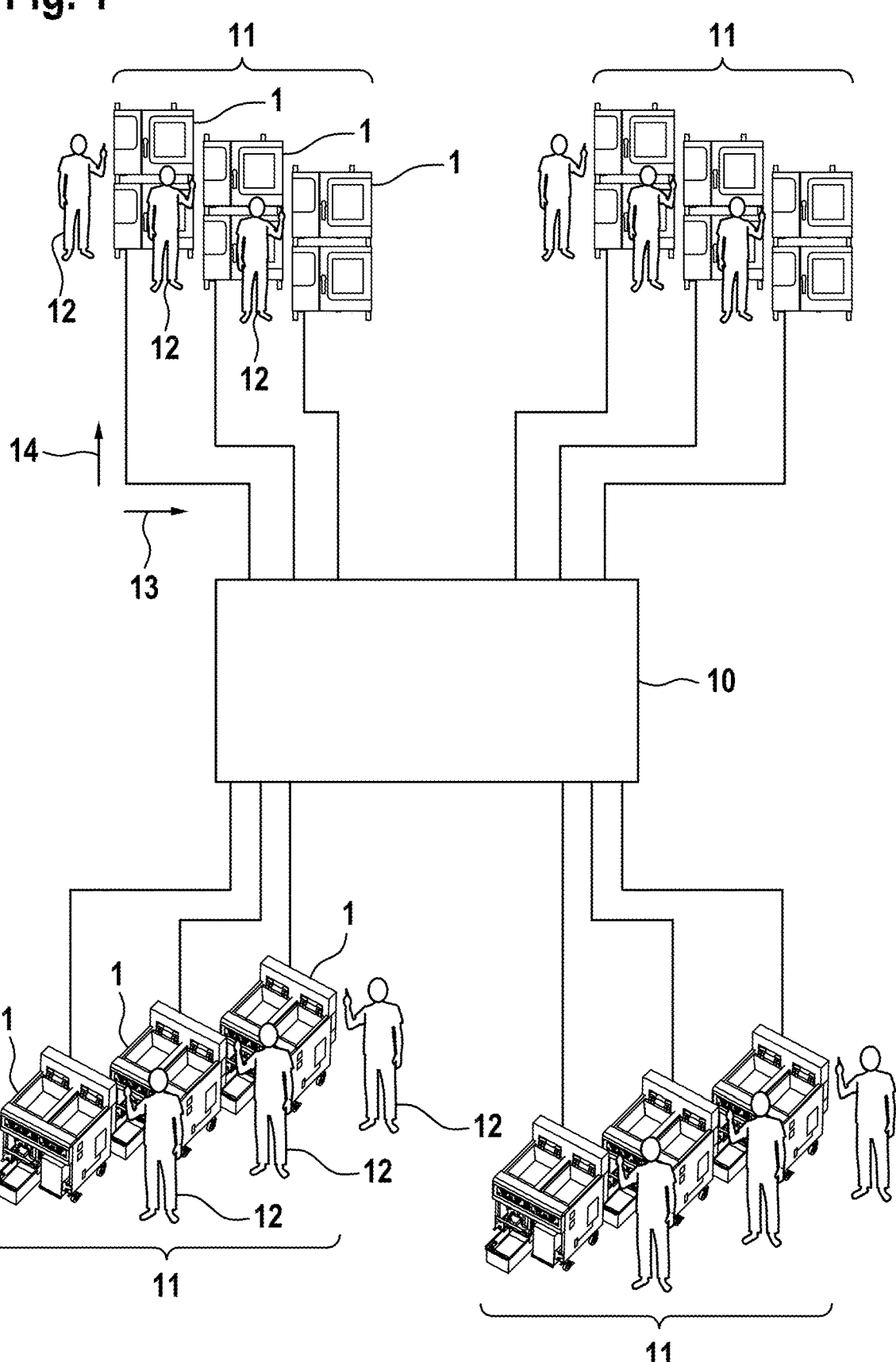
FIG. 1 a schematic view of apparatuses according to the invention and a central computing unit for carrying out the method according to the invention.
Figure 3:
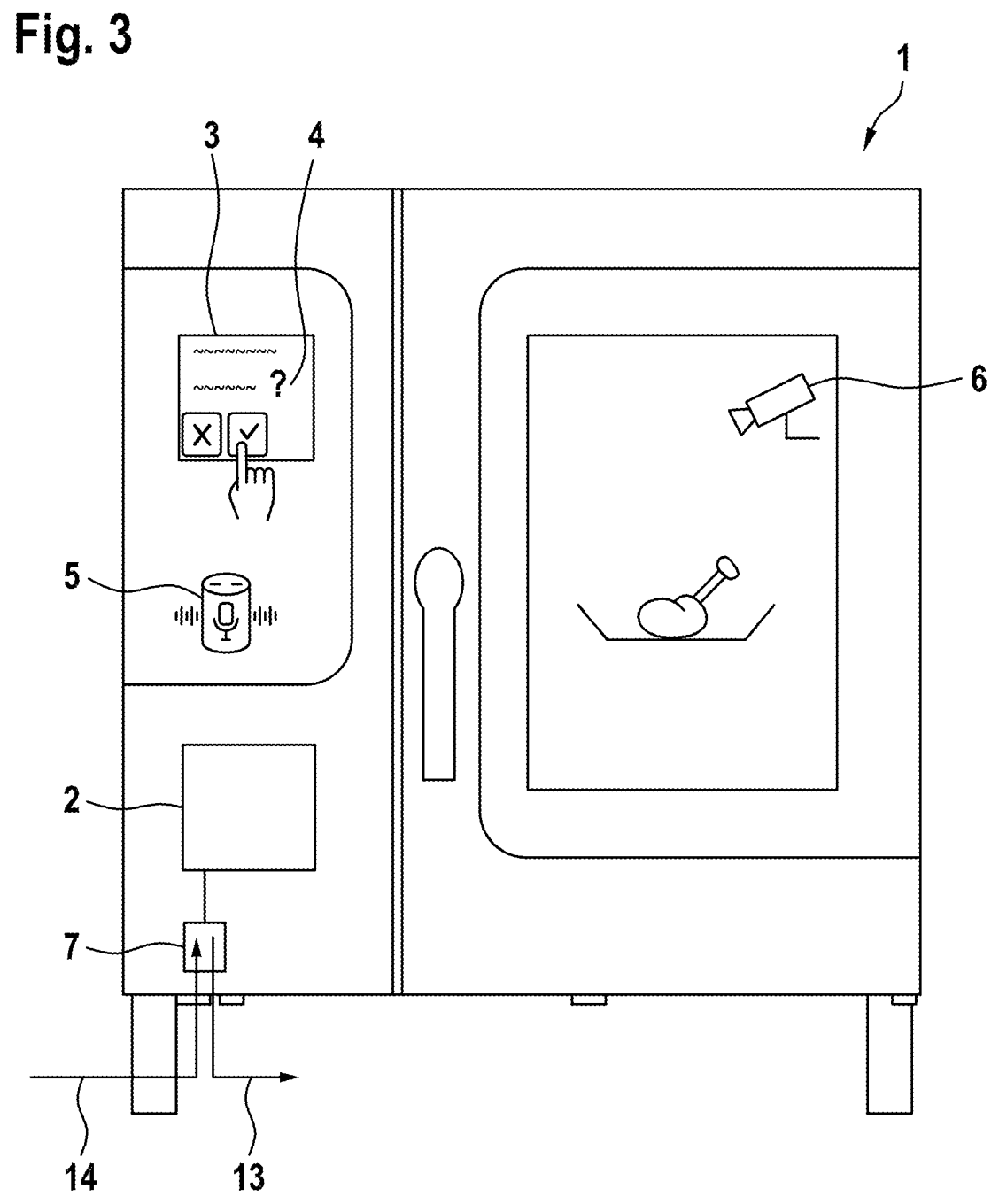
Figure 4:
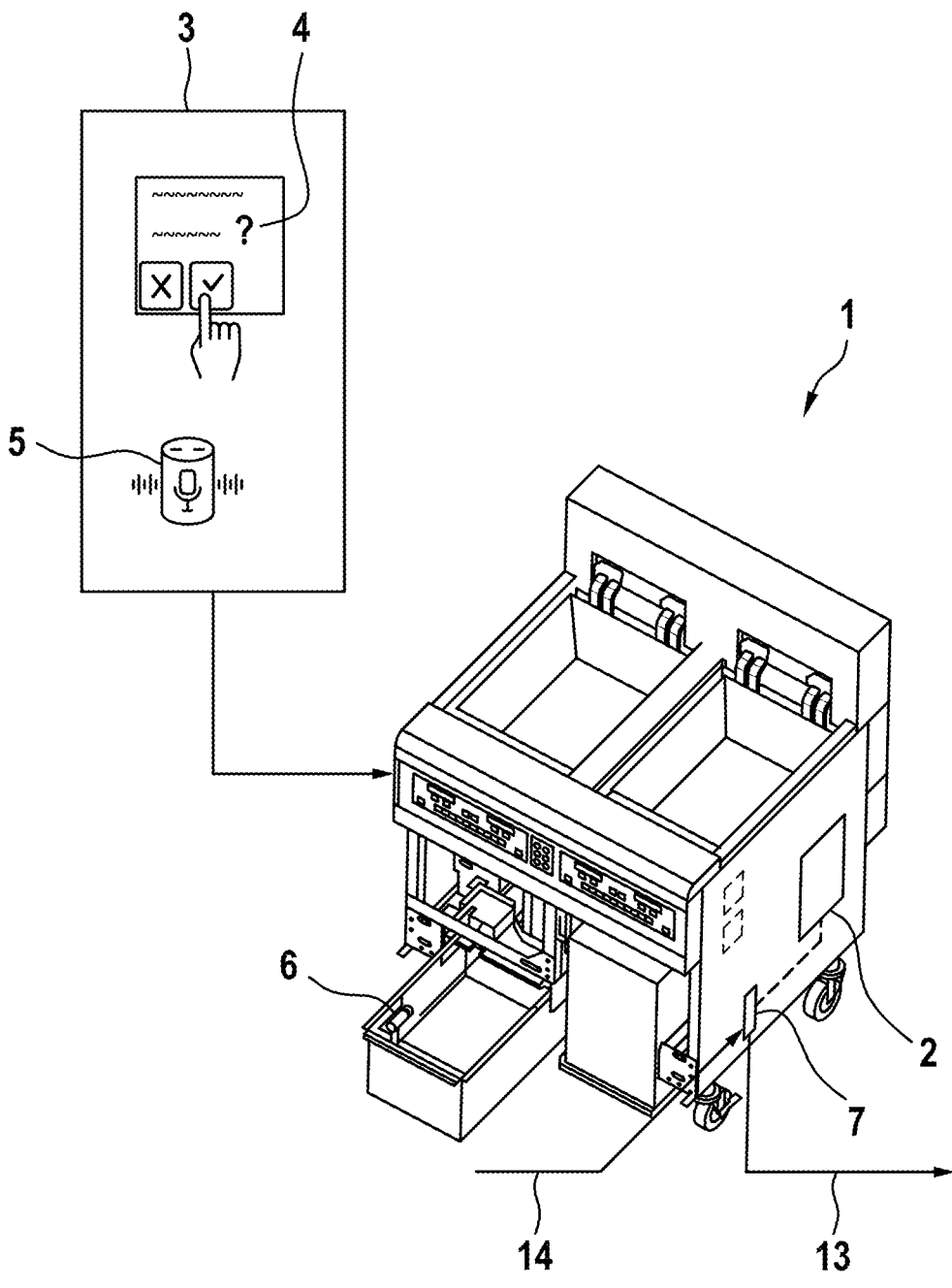
FIG. 4 an apparatus according to the invention for use in carrying out the process according to the invention, designed as a deep fryer.

FIG. 1 schematically shows four apparatus groups 11, each with a plurality of apparatuses 1. A user 12 is assigned to each apparatus 1. Apparatus 1 may be, for example, a combi-steamer as shown in FIG. 3, or a deep fryer as shown in FIG. 4. As explained in the general part of the description, apparatus groups 11 include apparatus 1 that are the same or similar, for example, in terms of their type of apparatus or their regional installation location.

FIG. 1 shows schematically that each apparatus 1 is connected to a central computing unit 10 via a corresponding data line. Feedback data sets 13 and change signals 14 are exchanged via this data line, whether wired or wireless.

Figure 2:
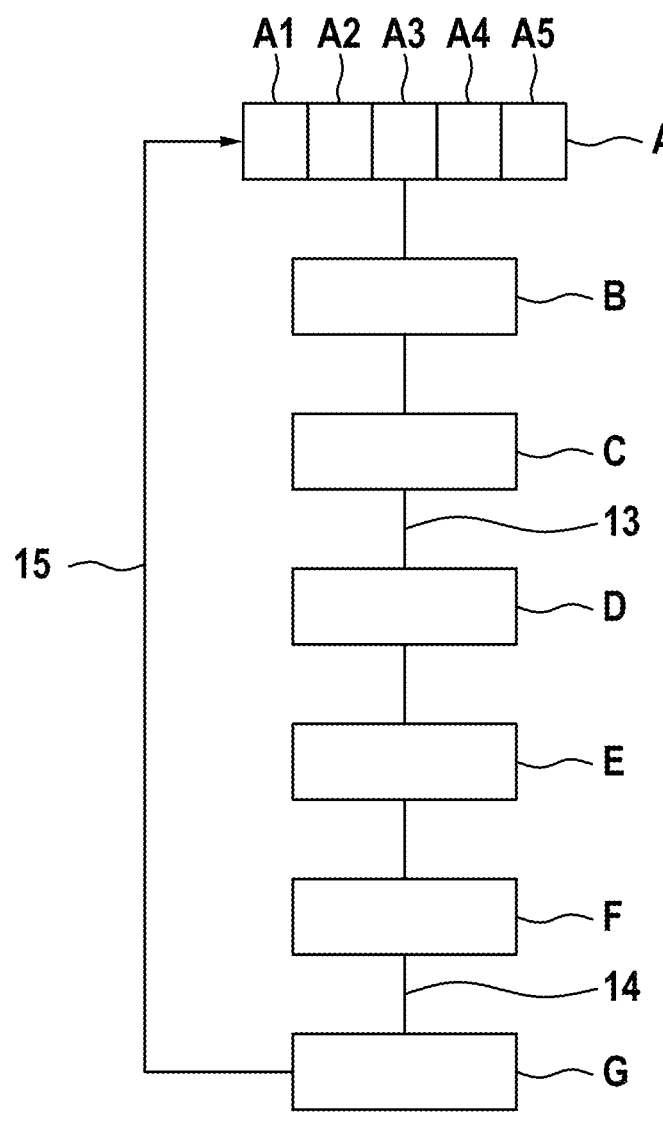
FIG. 2 a schematic view of the method steps A to G of the method according to the invention.

FIG. 2 schematically shows the sequence of steps A to G of the method. These method steps are explained in detail in the general part of the description and apply to this embodiment. In detail, the steps are as follows:

Step A: Feedback information is collected by means of a human-machine interface 3, hereinafter MMI, of the apparatus 1, and/or by means of at least one sensor 6 of the apparatus 1.

As mentioned earlier, feedback information can be collected in different ways. According to step A1, it is provided that the feedback information comprises a user feedback requested from the user 12 via the MMI 3, in particular in the form of a question to the user 12. In particular, this can be a "user input request" that has already been changed as part of step G—see schematic inference 15 from step G to step A in FIG. 2—or that is already activated in the delivery state of the apparatus 1.

Furthermore, according to step A2, the collected feedback information may comprise operating input. This operating input is made by the user 12 at the MMI 3 and is used to operate the apparatus 1, for example to select, start or terminate a function program. The MMI 3 does not pose a question to the user 12 for this type of feedback information, but instead uses an operating input already made by the user 12 to operate the apparatus 1 to obtain feedback information.

According to step A3, the collected feedback information may comprise a user action performed on the apparatus 1 by the user 12, wherein said user action is collected via the at least one sensor 6.

According to step A4, the sensor 6, in particular designed as a camera, can detect the food processed with the apparatus 1 and/or at least a part of the apparatus 1 and/or a state of the apparatus 1, from which corresponding sensor data are generated. The feedback information then in turn includes this sensor data.

According to step A5, an auxiliary means value of the apparatus 1, in particular a quantity value and/or quality value of an auxiliary means of the apparatus 1, can be detected via the sensor 6. The feedback information in turn comprises the auxiliary means value.

Step B: Forming, by means of a local control unit 2 in the apparatus 1, feedback data sets 13 representing one or more of the feedback information.

Step C: Sending the feedback data sets 13 from the apparatus 1 to a central computing unit 10.

Step D: Classifying, by means of the central computing unit 10, the feedback data sets 13 on the basis of at least one stored feedback comparison data set.

Step E: Generating, by means of the central computing unit 10, a change signal 14 depending on the classification of at least one feedback data set 13.

Step F: Sending the change signal 14 to the apparatus 1.

Step G: Changing a user input request of the MMI 3 directed to the user 12 in the apparatus 1 based on the change signal 14 and/or changing a function program of the apparatus 1 based on the change signal 14.

The method sequence can be as follows: For example, the sensor 6 (camera) can be used to detect which food product (e.g., pretzels) a user 12 inserts into the apparatus 1 (e.g., combi-steamer). The MMI 3 can then ask the user 12 whether pretzels were really inserted. The feedback data set 13 or record then contains information about which food was detected and whether the user 12 confirmed it. The central computing unit 10 can collect and statistically analyze these feedback data sets 13 from many apparatuses 1 over an extended period of time. As an example, pretzels are usually identified very well by the camera, whereas croissants are often not identified correctly. In the feedback comparison data set, it is stored in this theoretical example that a feedback data set 13 is "untrustworthy" if it describes that a false recognition was entered at the MMI 3 by user 12 for pretzels detected (by the camera). In step D, this allows future feedback data sets 13 to be classified as "untrustworthy" if necessary, thereby precluding the underlying apparatus 1 from providing further feedback via the change signal 14 by disabling the user input request. On the other hand, if it is recognized that "credible" feedback data sets 13 are coming from an apparatus 1 relatively frequently, then further user input requests at the MMI 3 can be activated at that apparatus 1 via the change signal 14.

Another example is described here to illustrate this: By way of example, the method considers two groups of apparatuses 11 in different regions, each having a plurality of apparatuses 1, designed as deep fryers. In step A, feedback information 13 is recorded in both groups 11 on a plurality of apparatuses 1 as to whether suggested replacement intervals for replacing the frying oil are complied with. For example, sensor 6, which detects the quality of the oil, can be used to determine whether or not replacement has actually taken place. In the central computing unit 10, the multiple feedback data sets 13 can be statistically analyzed, resulting in, for example, that the suggested change intervals are complied with in one region and not in the other one. Feedback data sets 13 or records that fit this pattern can be identified as credible, allowing underlying apparatuses 1 to participate in the following process: The apparatuses 1 are controlled via a corresponding change signal 14, in such a manner that a user input request issued to the user 12 by the MMI 3 is changed. In this case, for example, a question can be posed to the user via the MMI on these same apparatuses 1, for example, which oil suppliers are used or which foods are deep-fried.

FIG. 3 shows the apparatus 1 in the embodiment as a combi-steamer. The control unit 2, which is connected to a data interface 7, is shown. The data interface 7 is used to exchange data with the central computing unit 10. The control unit 2 can evaluate the change signal according to step G and then control the apparatus 1 accordingly. In particular, the human-machine interface 3 is changed via this change signal in the following MMI 3. As FIG. 3 shows in purely schematic form, the MMI 3 can comprise a touch-sensitive display 4 and/or a voice control unit 5. Both the display 4 and the voice control unit 5 make it possible to exchange information with the user 12.

As explained in the general part of the description, method step A1 provides for generating a user input request, for example in the form of a question. This is done with the MMI 3 shown here. The user 12 can answer this question with YES or NO, for example, which then generates the feedback information.

Furthermore, the user 12 can also make usual operating inputs at the MMI 3, for example to start a function program of the apparatus 1. This may also be the component of feedback information collected via the MMI 3, as described in the general part of step A2.

Furthermore, in step G, the MMI 3 can be changed to enable, disable, or change the content of a user input request of the MMI 3. This is also possible in the interaction of the control unit 2 with the MMI 3. This user input request issued by the MMI 3 is in turn followed by user feedback from the user 12, which may form feedback information in step A1.

FIG. 4 illustrates that other apparatuses 1, in this example a deep fryer, can also be used. This apparatus 1 according to FIG. 4 also comprises the control unit 2 and the data interface 7. Again, an MMI 3 with display 4 and/or voice control unit 5 is provided.

In the embodiment according to FIG. 3, a sensor 6 in the form of a camera is arranged. This sensor 6 may be designed to detect the feedback information according to step A3 or A4 (see general part of the description). In contrast, FIG. 4 shows the design of the sensor 6 for detecting the feedback information according to step A5 (see general part of the description), wherein sensor 6 in the embodiment according to FIG. 4 is used to detect the auxiliary means value, in the specific example the quality of the oil of the deep fryer.

To complete the description of the exemplary embodiment, which is schematically illustrated with reference to FIGS. 1 to 4, reference is made to the general part of the description.

What is claimed is:

1. A method for operating at least one food processing apparatus, the method comprising:
   Step A: collecting feedback information by at least one of means of a human-machine interface (MMI) of the apparatus, and means of at least one sensor of the apparatus;
   Step B: creating, by means of a local control unit in the apparatus, feedback data sets representing one or more feedback information items;
   Step C: sending the feedback data sets from the apparatus to a central computing unit;
   Step D: classifying, by means of the central computing unit, the feedback data sets as credible or untrustworthy based on at least one stored feedback comparison data set;
   Step E: generating, by means of the central computing unit, a change signal depending on the classification of at least one feedback data set;
   Step F: sending the change signal to the apparatus; and
   Step G: changing a user input request directed to the user by the MMI in the apparatus based on the change signal, wherein the change signal activates further user input requests when the at least one feedback data set is classified as credible, and the change signal disables the user input request when the at least one feedback data set is classified as untrustworthy.

2. The method according to claim 1, wherein the collected feedback information in Step A comprises at least one of:
   according to a Step A1, a user feedback requested from the user via the MMI, according to a Step A2, an operating input made by the user on the MMI for operating the apparatus; and
   according to a Step A3, a user action of the user detected by the sensor and carried out on the apparatus.

3. The method according to claim 1, wherein in Step A:
   according to a Step A4, the sensor detects at least one of: the food processed by the apparatus, at least a part of the apparatus itself, and a state of the apparatus, and generates sensor data therefrom, wherein the feedback information comprises the sensor data; and
   according to a Step A5, an auxiliary means value of the apparatus is detected via the sensor, wherein the auxiliary means value of the apparatus is at least one of a quantity value, and a quality value of an auxiliary means of the apparatus, and the feedback information comprises the auxiliary means value.

4. The method according to claim 1, wherein each of a plurality of apparatus groups are defined by a plurality of the apparatuses, wherein for apparatuses of each apparatus group: in the Step A, feedback information is recorded and in Step F, the change signal is transmitted.

5. The method according to claim 4, wherein the apparatuses of the plurality of apparatus groups differ with respect to at least one of the following properties:
   apparatus type of the apparatuses;
   intended use of the apparatuses;
   regional location of the apparatuses; and
   apparatus equipment of the apparatuses.

6. The method according to claim 1, wherein in Step D the feedback data set is classified depending on its correspondence with at least one feedback comparison data set.

7. The method according to claim 6, wherein the correspondence of the feedback data set with at least one feedback comparison data set is determined in the central computing unit by means of artificial intelligence.

8. The method according to claim 1, wherein in Step D the feedback data sets are classified using feedback comparison data sets based on one or more of:
   a plurality of feedback data sets of the same apparatus;
   from a plurality of feedback data sets of a plurality of apparatuses; and
   from empirical data.

9. The method according to claim 1, wherein in the central computing unit the at least one feedback comparison data set is generated by statistical evaluation of a plurality of feedback data sets.

10. The method according to claim 9, wherein at least one of patterns, regularities, irregularities, and clusters are identified in the plurality of feedback data sets during statistical evaluation.

11. The method according to claim 1, wherein:
   each of a plurality of apparatus groups are defined by a plurality of the apparatuses,
   in Step E, the change signal is generated depending on the classification of the feedback data sets of an apparatus of the apparatus group, a plurality of apparatuses of the apparatus group or all apparatuses of the apparatus group, and
   in Step F, the same change signal is sent to a plurality of or all apparatuses of the apparatus group.

12. The method according to claim 1, wherein, depending on the classification of the feedback data set, a change data set is generated or changed by means of the central computing unit, and wherein one or more of the following is stored in the change data set:
   a manner in which and a time at which the user input request of the MMI is changed on the apparatus by means of the change signal.

13. The method according to claim 1, wherein, based on the change signal, at least one of the following function programs is completely or partially changed:
   a food processing program for processing food in the apparatus,
   a cleaning program for cleaning the apparatus, and
   an assistance program that supports the user during the operation or maintenance of the apparatus.

14. A food processing apparatus adapted for use during carrying out of a method according to claim 1, wherein the apparatus comprises:
   a human-machine interface (MMI) and a sensor, each configured to perform Step A;
   a control unit configured to perform Step B; and
   a data interface configured to send the feedback data set according to Step C and for receiving the change signal transmitted according to Step F,

wherein the control unit, is configured to change the user input request directed to the user from the MMI according to Step G.

* * * * *